(12) United States Patent
Plamper et al.

(10) Patent No.: US 6,220,005 B1
(45) Date of Patent: Apr. 24, 2001

(54) ELECTRIC MOWER SWITCH

(75) Inventors: Gerhard Plamper, Valley City; Nick Ciavarella, Cleveland; Karim M. Abood, Broadview Heights, all of OH (US)

(73) Assignee: MTD Products Inc, Cleveland, OH (US)

( * ) Notice: Subject to any disclaimer, the term of this patent is extended or adjusted under 35 U.S.C. 154(b) by 0 days.

(21) Appl. No.: 08/557,476

(22) Filed: Nov. 14, 1995

(51) Int. Cl.[7] ..................................................... A01D 69/00
(52) U.S. Cl. ........................ 56/10.8; 74/783 R; 180/19.3
(58) Field of Search .................................. 56/10.3, 11.9, 56/DIG. 18; 74/483 R, 483 PB; 180/14.7

(56) References Cited

U.S. PATENT DOCUMENTS

| 4,413,466 | * | 11/1983 | Beugelsdyk et al. | 56/11.3 |
| 4,428,180 | * | 1/1984 | Carlson | 56/11.3 |
| 4,455,811 | * | 6/1984 | Beugelsdyk | 56/10.8 |
| 4,466,232 | * | 8/1984 | Beugelsdyk et al. | 56/10.8 |
| 4,466,308 | * | 8/1984 | Kester et al. | 74/483 R |
| 4,573,307 | * | 3/1986 | Wick | 56/10.8 X |
| 4,599,912 | * | 7/1986 | Barnard et al. | 74/501 R |
| 4,614,130 | * | 9/1986 | Heismann et al. | 74/501 R |
| 4,667,459 | * | 5/1987 | Scanland et al. | 56/10.8 R |
| 4,833,935 | * | 5/1989 | Roelle | 56/10.8 X |

* cited by examiner

Primary Examiner—Victor Batson
(74) Attorney, Agent, or Firm—Emerson & Skeriotis; Roger D. Emerson; Timothy D. Bennett

(57) ABSTRACT

An electric switch operating mechanism is disclosed utilizing a rotating bail and a secondary inward moving interlock, wherein a single multiple function spring rotatively biases the moving bail into an inactive position, biasing the interlock into a non-engaged outward position and in addition operates the switch.

18 Claims, 4 Drawing Sheets

ELECTRIC MOWER SWITCH

FIELD OF THE INVENTION

This invention relates to a switch for an electric mower, and more particularly in the preferred embodiment, to a switch for a battery powered electric mower.

BACKGROUND OF THE INVENTION

Electric powered mowers and other lawn and garden appliances are increasingly becoming important to lawn and garden care. A major reason for this is that environmental restrictions require less and less emissions from lawn appliances. These restrictions can even preclude the utilization of conventional internal combustion engines. This provides an environment which is conducive to electric powered devices.

OBJECTS AND SUMMARY OF THE INVENTION

It is an object of the present invention to simplify the construction of electric powered appliances.

It is another object of the present invention to simplify the design of electric powered appliances.

It is still another object of the present invention to lower the costs of electric powered appliances.

It is yet another object of this invention to simplify the operation of electric powered appliances.

Other objects and a more complete understanding of the invention may be had by referring to the following descriptions and drawings in which:

BRIEF DESCRIPTION OF THE DRAWINGS

The structure, operation and advantages of the presently disclosed preferred embodiment of the invention will become apparent when considered in view of the following description, particularly in conjunction with the accompanying drawings wherein.

DETAILED DESCRIPTION OF THE INVENTION

Figure 1:
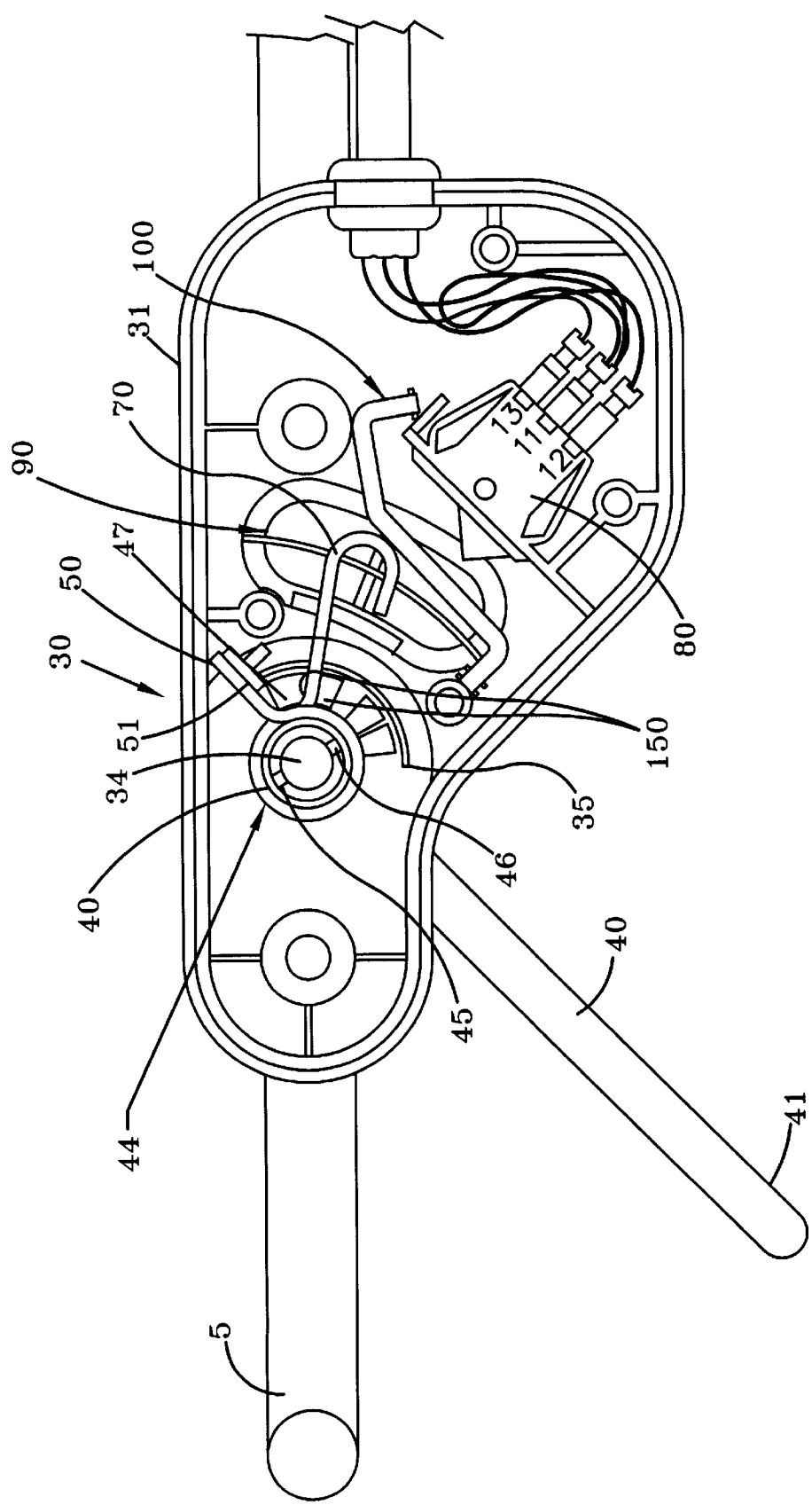
FIG. 1 is a cross sectional side view of the preferred embodiment of the invention.
Figure 2:
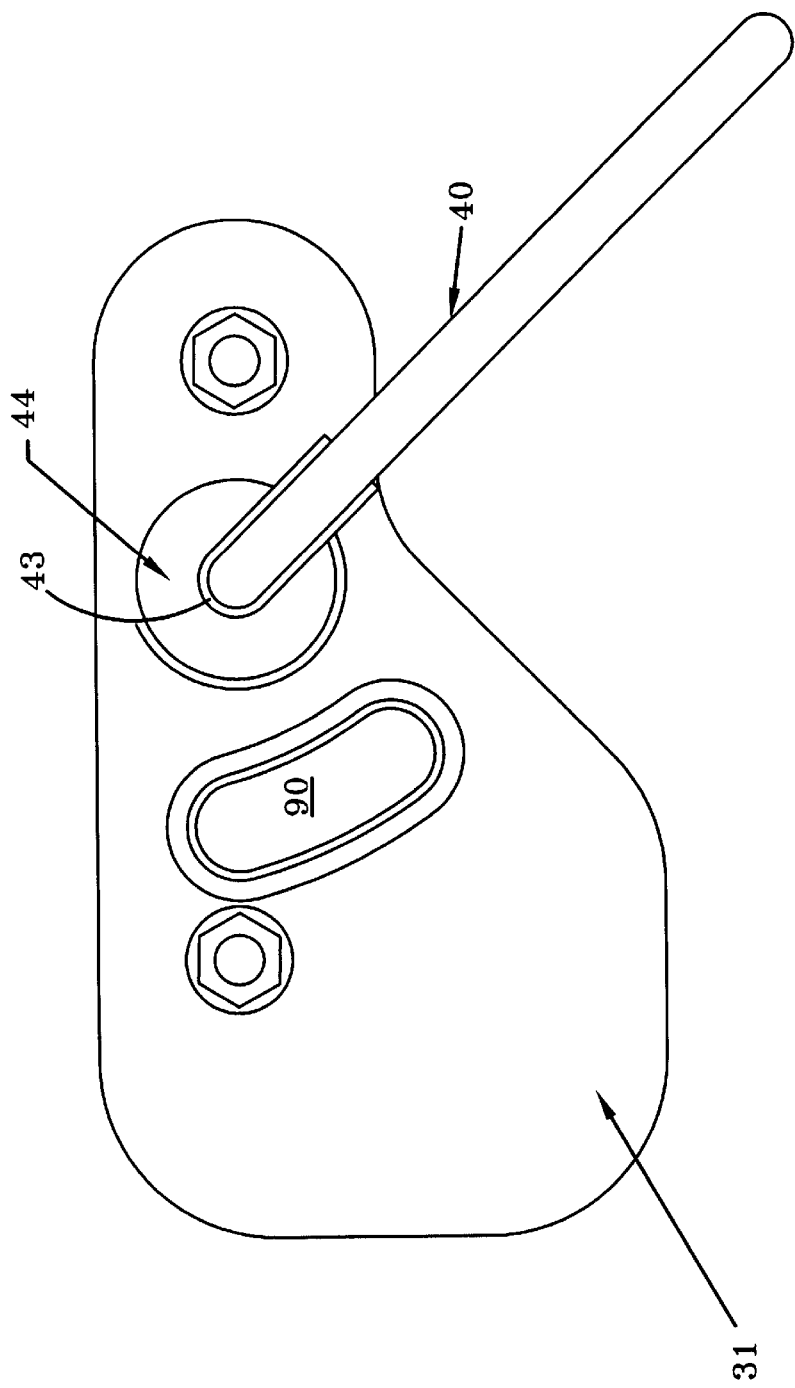
FIG. 2 is a side view of the preferred embodiment of FIG. 1 from the back side in respect to FIG. 1.
Figure 3:
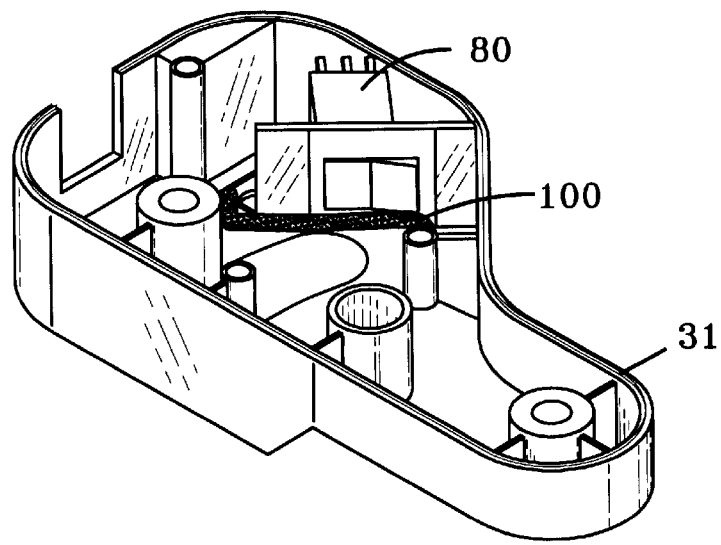
FIG. 3 is a perspective view of the preferred embodiment of FIG. 1 illustrating the alignment piece and switch.
Figure 4:
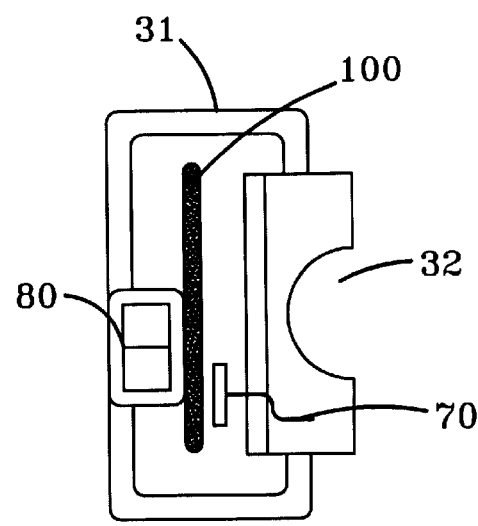
FIG. 4 is a cross sectional view of the embodiment of FIG. 1 taken along lines 4—4 thereof.
Figure 5:
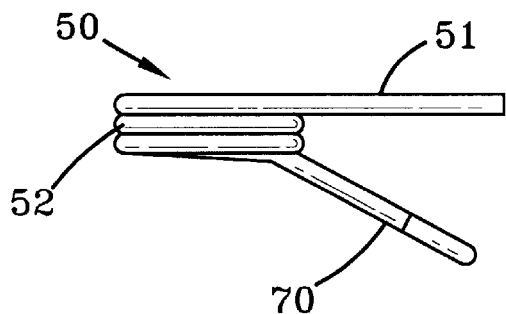
FIG. 5 is a side view of the multiple function spring of FIG. 1.
Figure 6:
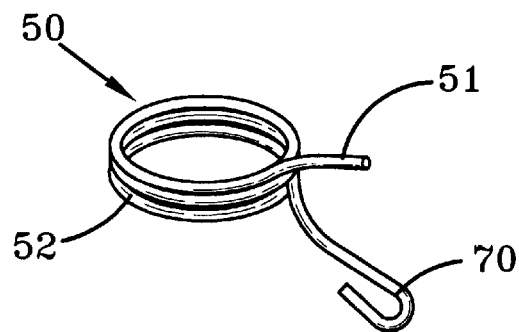
FIG. 6 is a perspective view of the spring of FIG. 5.
Figure 7:
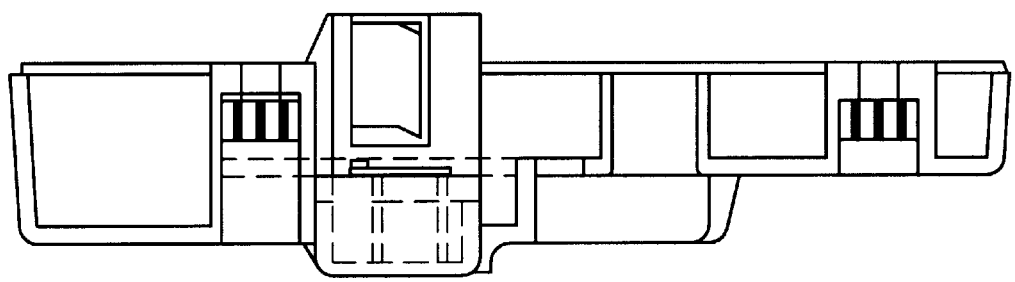
FIG. 7 is a view of a cutaway cross sectional view of the case of the embodiment of FIG. 2.

This invention relates to a new and novel switch for a device including an electric component.

The invention will be described in its preferred embodiment of a switch for a battery powered electric lawn mower incorporating a operator presence bail.

The particular lawn mower disclosed includes a housing, a motor, and a switch mechanism 30.

The housing is designed to hold the motor and rotary blade in position in respect to the vegetation being cut, in addition to dispersing same over the traversed field and/or bagging same. The particular housing disclosed is a mulching housing.

The motor is intended to provide the power for the blade within the housing, which blade actually accomplishes the cutting of the vegetation. The particular motor disclosed is a G.E. electric motor having the capability of 17 amps at 24 volts.

The switch 30 which is the subject of this application is designed to incorporate the specific invention of the present application.

Customarily, with electric lawn mowers, there is some sort of switch which allows the selective activation of the motor, and thus the cutting of vegetation underneath the housing, based upon a particular positioning of switches. In addition due to certain regulatory restrictions, it is preferred that the motor not operate until certain operation restrictions are met, one of which is that the operator be present behind the handle bars. Most electric lawn mowers therefore have a bail 40 which is operative based on the operator's presence in order to allow the functioning of the motor, in addition to the utilization of a separate manual turn on switch.

On selective manipulation of the bail from the operator's position the motor operates, with such operation ceasing upon release of the bail. Certain mowers also incorporate a secondary interlocking control that must be manually set prior to manipulation of the bail so as to avoid unintentional operation.

These mower controls typically have many moving parts and a number of biasing springs, all of which increase the cost and complexity of the controls. Further, and in certain devices with interlocking controls, it is possible to move the bail without manipulating the secondary interlocking control (i.e., movement that physically damages the device).

The present invention provides a switch 30 with few parts, including a multiple function spring. The switch 30, while including a secondary interlocking control, further has an associated bail that can be moved at any time between positions anywhere along its arc of movement without physical damage to the switch or any of its components.

In the present invention, there is a bias means, such as a multiple function spring 50, which: 1) biases the bail 40 in an inactivated condition; 2) biases the secondary interlocking control (later described button 90) outwards into an inactivated condition; and further, 3) serves to toggle the electric switch 80 between on and off states. This reduces the number of parts for the control while simplifying its construction.

The environment of this switch 30 begins with a molded two piece plastic case 31. The case 31 serves to retain the parts of the switch 30 in their operative positions with respect to each other as well as providing some environmental protection thereto. A semi-circular groove 32 running lengthwise down one piece of the plastic case 31 serves to align the case 31 to the handle bars 5 of the mower while bolts through holes in both pieces of the case 31 and such handle bars retain the case 31 in position. Preferably, glue and/or small screws hold the case 31 together as a single unit before the bolts are inserted. This allows for the switch 30 and its contained parts to be assembled at a location and/or time different than its point of installation on the mower without concern for losing or misaligning parts.

The case 31 includes mounting positions for the bail 40, the multiple function spring 50, the interlock button 90, the actual switch 80, and an alignment piece 100.

The bail 40 is the manual operator presence sensor for the mower. It is thus something that needs to be actively selectively manipulated in order for the mower to function.

The particular bail 40 disclosed is a metal rod 41 bent into a large U with two end pivots 43. The width of the U is approximately equal to the distance between the inner edge of the case to the opposite handle bar with a total width across the pivots equal to or slightly more than the distance from the outer edges of the case 31 to the outer edge of the opposite handlebar. This allows the bail 40 to be retained in an operative position and rotated with respect to the handle bars.

The bail 40 is preferably pivotally mounted to the case 31 and the opposing handle bar with the U section positioned beneath the handle bars. This allows the gravity to assist movement of the bail 40 to an inactivated position upon operator release thereof, thus reducing the strength requirements of the spring 50.

The pivot mounting of the bail 40 to the case 31 includes an intermediate pivot piece 44. This pivot piece 44 is a generally cylindrical hat shaped piece of plastic that fits into a correspondingly shaped cavity 34 in the case 31. This intermediate piece allows for smooth rotation of the bail 40 as well as allowing for an efficient interconnection to the later described spring 50.

The case 31 has an opening 35 for about 60°. This allows for the fork 47 of the pivot piece 44 to extend into the opening 35 of the case 31 so as to interconnect the later described extension 70 of the spring 50 to the pivot piece 44 (and thus the bail 40). The extension 70 of the spring 50 is located within the fork 47 to connect to the pivot piece 44 for common movement. The extension 70, as shown in FIG. 1, is captured between tongs 150 of the extending fork 47.

The bail 40 is fixedly connected to the pivot piece 44, in the embodiment disclosed via a slot 45 in the end of the bail 40 and a corresponding raised cross member 46 in the pivot piece 44. Glue or other means of interconnection could alternately be used. The other end of the bail 40 extends through a simple equal diameter hole in the opposing handle bar in a conventional manner.

As previously set forth, the spring 50 performs multiple functions.

The spring 50 is itself a split spiral wound spring having an extension 70 at one end and a stub 51 at the other end with spirals 52 intermediate. This spring 50 is within the case 31 with the spirals 52 extending about the inner circumference of the pivot piece 44 with the axis of the spring 50 coincident with the axis of the bail 40.

This is accomplished by the fact that the axis of the spring 50 is coincident with the axis of the bail 40. With this coincidence and that fact that the spring 50 is interconnected with the bail 40 through the pivot piece 44, the bail 40 is maintained in a unstressed condition without actuation of switch 30.

In addition to the above, there is an extension 70 of the spring 50. Normally in its normal position, this extension 70 does not cause anything to occur (i.e., the bail 40, and with it the extension 70, can be moved throughout its full extent without anything happening).

There is, however, in a preferred embodiment of the invention a toggle means, a such as button 90. This button 90 selectively causes movement of the extension 70 of spring 50 axially of the axis of such spring, which movement causes such extension to toggle the switch 80 between inactive and activated positions. The reason for selective activation of the switch 80 is due in part in the preferred embodiment to the alignment piece 100, which alignment piece 100 reacts with the movement of the button 90 so as to cause extension 70 to interact with the spring 50.

In the absence of the actuation of the button 90, the extension 70 will move on one side of the alignment piece 100—the inner side shown—and thus will not activate the switch 80.

Upon actuation of the button 90, the extension 70 is physically relocated to the other side of the alignment piece. Thus on movement of the bail 40 causes the extension 70 of the spring 50 to interact with the switch 80 so as to cause the actuation thereof. Thus, the position of the button 90 interacts with the positioning of the bail 40 to allow the actuation or inactivation of the switch 80, and thus to control the operational status of the connected mower 10.

The spring 50 thus both biases the bail 40 into its inoperative position and in addition, by the extension 70, provides for the actuation or inactivation of the related mower blade.

The button 90 thus controls the operation of the mower, irrespective of the position of the bail 40. In this respect it is noted the bail 40 can be moved from an inactive to an active position with no effect on the operational status of the mower. In specific, it is necessary for the button 90 to be pressed from an inactive to an active condition before the mower will actually function as a vegetation cutting unit. Without actuation of the button 90, the bail 40 would be moved, but no active cutting action will be produced by the mower and no physical harm will be occasioned to the control mechanism.

Although this invention has been described in its preferred mode with a certain degree of particularity, it is to be understood certain changes can be made without deviating from the invention as hereinafter claimed.

What is claimed is:

1. In an electric lawn care appliance having a housing and a power connection controlled by a switch, a control for electric starting, comprising:
    a bail;
    bias means to bias said bail into an inactive power condition, said bias means including a spring, movement of said bail causing movement of said spring, movement of said spring by said bail moving said spring into contact with the switch, and toggling the switch to activate the power connection; and
    a button, said button being movably mounted to the housing, said button shifting said spring causing said spring to directly activate the power connection.

2. The control of claim 1 characterized by said bail being movable without damaging the bail or its interconnections.

3. The control of claim 1 characterized in that said button shifts said spring before movement of said bail.

4. The control of claim 1 characterized in that said spring also biases said button with respect to the housing.

5. The control of claim 1 characterized by the addition of an alignment piece, and said movement of said button with respect to the housing moving said spring to be physically relocated with respect to said alignment piece to a position to interact with the switch to directly activate the power connection.

6. The control of claim 1 characterized by said bail being movable without damaging said bail or its interconnections.

7. The control of claim 6 characterized by the addition of an alignment piece to prevent said spring from shifting the switch to directly activate the power connection in absence of previous movement of said button with respect to said housing.

8. In an electric lawn care appliance having a housing and a power connection controlled by a switch, a control for electric starting, comprising:

a bail;

bias means to bias said bail into an inactive power condition, said bias means including a spring, movement of said bail causing movement of said spring, movement of said spring by said bail moving said spring into contact with the switch to activate the power connection; and a button, said button moving said spring laterally with respect to an alignment piece in order to be in a position to activate the power connection.

9. In an electric mower having handle bars, housing and a power connection to a motor controlled by a switch, a control for electric starting, comprising, a bail;

said bail rotatively connected to the handle bars, a bias means to bias said bail into an inactive power condition with respect to the handle bars, said bias means having an extension, and toggle means for movement of said bail to move said extension of said bias means into contact with the switch to activate the power connection turning the motor on, wherein said toggle means includes a button, and said button moves said extension of said bias means between active and inactive conditions.

10. The control of claim 9 characterized in that said bail has a rotary axis, said spring has a rotary axis, and said rotary axis of said spring being coextensive with said rotary axis of said bail.

11. In an electric mower having handle bars, a housing and a power connection to a motor controlled by a switch, a control for electric starting, comprising:

a bail, said bail rotatively connected to the handle bars;

a spring, said spring biasing said bail into an inactive first position, said bail being movable by an operator to an active second position, said spring having an extension, and toggle means for movement of said bail to move said extension of said spring into contact with the switch to directly activate the power connection turning the motor on upon operator movement of said bail to said active second position;

wherein said toggle means for said extension to manipulate the switch to directly activate the power connection includes a button, and said button moves said extension of said spring between active and inactive conditions.

12. The control of claim 11 characterized by the addition of said button being movably mounted to the housing, said button shifting said extension of said spring causing the switch to directly activate the power connection.

13. The control of claim 12 characterized in that said button shifts said extension of said spring before movement of said bail.

14. The control of claim 12 characterized by the addition of an alignment piece, and said movement of said button with respect to the housing moving said extension of said spring to be physically relocated with respect to said alignment piece to a position to interact with the switch to directly activate the power connection.

15. In an electric lawn care appliance having a housing and a power connection controlled by a switch, a control for electric starting, comprising:

a bail;

bias means to bias said bail into an inactive power condition, said bias means including a spring, movement of said bail causing movement of said spring, movement of said spring causing the switch and power connection to be in an active power condition; and a button, said button being movably mounted to the housing, said button shifting said spring conditions causing the switch and power connection to be in an active power condition, an alignment piece, and said button moving said spring laterally with respect to said alignment piece in order to be in a position to switch the power connection.

16. The control of claim 15 characterized by said bail being movable without damaging said bail or its interconnections.

17. In an electric mower having handle bars, housing and a power connection controlled by a switch, a control for electric starting, comprising:

a bail, said bail rotatively connected to the handle bars;

a bias means to bias said bail into an inactive power condition with respect to the handle bars, said bias means including a spring, said spring having an extension, toggle means for said extension to manipulate the switch for the power connection to an active condition;

said bail having a rotary axis, said spring having a rotary axis, said rotary axis of said spring being coextensive with said rotary axis of said bail, an alignment piece, and said toggle means for said extension to manipulate the switch for the power connection including a button; and said button moving said extension of said spring laterally with respect to said alignment piece between active and inactive conditions.

18. In an electric mower having handle bars, housing and a power connection controlled by a switch, a control for electric starting, comprising:

a bail, said bail rotatively connected to the handle bars, a spring, said spring biasing said bail into an inactive first position, said bail being movable by an operator to an active second position;

said spring having an extension, a button, an alignment piece, said alignment piece having two sides, said button moving said extension of said spring between said two sides of said alignment piece; and said extension of said spring manipulating the switch of the power connection to an active condition upon operator movement of said button and bail to place said extension in a side position with respect to said alignment piece.

* * * * *